(12) United States Patent
Mossoba et al.

(10) Patent No.: US 12,531,052 B2
(45) Date of Patent: Jan. 20, 2026

(54) IMAGE DESCRIPTION GENERATION FOR A SCREEN READER BASED ON A SETTING INDICATING A LEVEL OF VERBOSITY

(71) Applicant: Capital One Services, LLC, McLean, VA (US)

(72) Inventors: Michael Mossoba, Great Falls, VA (US); Abdelkader M'Hamed Benkreira, Brooklyn, NY (US); Noel Lyles, Alexandria, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 430 days.

(21) Appl. No.: 17/810,765

(22) Filed: Jul. 5, 2022

(65) Prior Publication Data

US 2024/0013768 A1    Jan. 11, 2024

(51) Int. Cl.

| G10L 13/047 | (2013.01) |
| G06T 7/194 | (2017.01) |
| G06V 10/764 | (2022.01) |
| G06V 10/86 | (2022.01) |
| G09B 21/00 | (2006.01) |
| G10L 13/08 | (2013.01) |

(52) U.S. Cl.
CPC ............ *G10L 13/047* (2013.01); *G06T 7/194* (2017.01); *G06V 10/764* (2022.01); *G06V 10/86* (2022.01); *G09B 21/006* (2013.01); *G10L 13/08* (2013.01)

(58) Field of Classification Search
CPC ....... G10L 13/047; G10L 13/08; G10L 13/00; G06T 7/194; G06V 10/764; G06V 10/86; G06V 10/765; G09B 21/006
See application file for complete search history.

(56) References Cited

U.S. PATENT DOCUMENTS

2014/0358538 A1*  12/2014  Hecht ..................... G10L 15/07
                                                            704/243
2015/0169572 A1*  6/2015  Taubman ............. G06F 16/5854
                                                            707/723

(Continued)

OTHER PUBLICATIONS

Cole Gleason et al., "'It's almost like they're trying to hide it': How User-Provided Image Descriptions Have Failed to Make Twitter Accessible," 2019 IW3C2 (International World Wide Web Conference Committee), pp. 549-559, available at https://doi.org/10.1145/3308558.3313605.

(Continued)

*Primary Examiner* — Michael N Opsasnick
(74) *Attorney, Agent, or Firm* — Harrity & Harrity, LLP

(57) ABSTRACT

In some implementations, a browser extension may receive a setting indicating a level of verbosity and may receive an image and a set of words associated with the image. The browser extension may identify a foreground of the image and a background of the image and may identify, within the foreground of the image, a set of objects. The browser extension may rank the set of objects based on one or more properties of the set of objects and the set of words and may select a subset of objects from the set of objects based on the setting and the ranking. Accordingly, the browser extension may generate descriptions of the selected subset of objects based on the setting and may input the generated descriptions to a text to speech algorithm.

20 Claims, 9 Drawing Sheets

(56) References Cited

U.S. PATENT DOCUMENTS

| | | | |
|---|---|---|---|
| 2016/0217575 A1* | 7/2016 | Bernal | G06T 7/90 |
| 2018/0329581 A1* | 11/2018 | Liu | G06F 16/957 |
| 2019/0034412 A1* | 1/2019 | Gupta | G06V 30/194 |
| 2019/0361694 A1* | 11/2019 | Gordon | G06F 9/452 |
| 2020/0013380 A1* | 1/2020 | Kakoyiannis | G06F 16/61 |
| 2021/0042579 A1 | 2/2021 | Chen et al. | |
| 2022/0129123 A1* | 4/2022 | Nair | G06F 8/38 |
| 2022/0230372 A1* | 7/2022 | Thornér | G06F 40/169 |
| 2022/0245179 A1* | 8/2022 | Dernoncourt | G06F 16/338 |

OTHER PUBLICATIONS

Sahar Kazemzadeh et al., "ReferItGame: Referring to Objects in Photographs of Natural Scenes," Proceedings of the 2014 Conference on Empirical Methods in Natural Language Processing (EMNLP) (Doha, Qatar), pp. 787-798.

Lucia Specia et al., "A Shared Task on Multimodal Machine Translation and Crosslingual Image Description," Proceedings of the First Conference on Machine Translation, vol. 2 (2016) (Berlin, Germany), pp. 543-533.

Ramakrishna Vedantam et al., "CIDEr: Consensus-based Image Description Evaluation," Computer Vision Foundation (2015), pp. 4566-4575.

* cited by examiner

IMAGE DESCRIPTION GENERATION FOR A SCREEN READER BASED ON A SETTING INDICATING A LEVEL OF VERBOSITY

BACKGROUND

Users with visual impairments often use screen readers to generate audio based on content displayed on a screen. For example, a visually impaired user may navigate to a webpage, using a user device, and use a text-to-speech algorithm to generate audio based on content of the webpage.

SUMMARY

Some implementations described herein relate to a system for image description generation for screen readers. The system may include one or more memories and one or more processors communicatively coupled to the one or more memories. The one or more processors may be configured to receive a setting indicating a level of verbosity. The one or more processors may be configured to receive an image and a set of words associated with the image. The one or more processors may be configured to identify a foreground of the image and a background of the image. The one or more processors may be configured to identify, within the foreground of the image, a set of objects. The one or more processors may be configured to rank the set of objects based on one or more properties of the set of objects and the set of words. The one or more processors may be configured to select a subset of objects from the set of objects based on the setting and the ranking. The one or more processors may be configured to generate descriptions of the selected subset of objects based on the setting. The one or more processors may be configured to input the generated descriptions to a text-to-speech algorithm.

Some implementations described herein relate to a method of image description generation for screen readers. The method may include receiving an image and a set of words associated with the image. The method may include identifying a foreground of the image and a background of the image. The method may include determining, based on the set of words, that the background is more important than the foreground. The method may include generating a description of the background. The method may include inputting the generated description to a text-to-speech algorithm.

Some implementations described herein relate to a non-transitory computer-readable medium that stores a set of instructions for image description generation for screen readers for a device. The set of instructions, when executed by one or more processors of the device, may cause the device to receive a setting indicating a level of verbosity. The set of instructions, when executed by one or more processors of the device, may cause the device to receive an image and a set of words associated with the image. The set of instructions, when executed by one or more processors of the device, may cause the device to identify a foreground of the image and a background of the image. The set of instructions, when executed by one or more processors of the device, may cause the device to identify, within the foreground of the image, a set of objects. The set of instructions, when executed by one or more processors of the device, may cause the device to rank the set of objects based on one or more properties of the set of objects and the set of words. The set of instructions, when executed by one or more processors of the device, may cause the device to select a subset of objects from the set of objects based on the setting and the ranking. The set of instructions, when executed by one or more processors of the device, may cause the device to generate descriptions of the selected subset of objects based on the setting. The set of instructions, when executed by one or more processors of the device, may cause the device to combine the generated descriptions using a plurality of connecting phrases into a narrative. The set of instructions, when executed by one or more processors of the device, may cause the device to input the narrative to a text-to-speech algorithm.

DETAILED DESCRIPTION

The following detailed description of example implementations refers to the accompanying drawings. The same reference numbers in different drawings may identify the same or similar elements.

Many applications and operating systems provide screen readers that generate audio based on content displayed on a screen. For example, a visually impaired user may use a browser application to navigate to a webpage and use a screen reader (that includes a text-to-speech algorithm) to generate audio based on content of the webpage. However, screen readers generally use alternative text (e.g., associated with images and/or other multimedia content) that is activated when the screen reader is used. The alternative text may lack descriptiveness, which degrades user experience. Additionally, screen readers can consume significant amounts of processing resources and power when trying to generate descriptions of images and/or other multimedia content.

Some implementations described herein provide for conserving processing resources and power by generating shorter descriptions, to be converted to audio by a text-to-speech algorithm (e.g., included in a screen reader), based on a setting. For example, a user may provide the setting, indicating a level of verbosity, in order to shorten the descriptions. Additionally, or alternatively, a relevance model may determine whether to exclude a description of a background of an image or a background of an image in order to shorten the description that is input to the text-to-speech algorithm. As a result, a user device consumes less power and processing resources when providing text-to-speech for the user.

FIGS. 1A-1D are diagrams of an example 100 associated with image description generation for screen readers. As shown in FIGS. 1A-1D, example 100 includes a mobile application (e.g., executed on a user device), an input device, a speaker, and a remote server. These devices are described in more detail in connection with FIGS. 3 and 4.

Figure 1A:
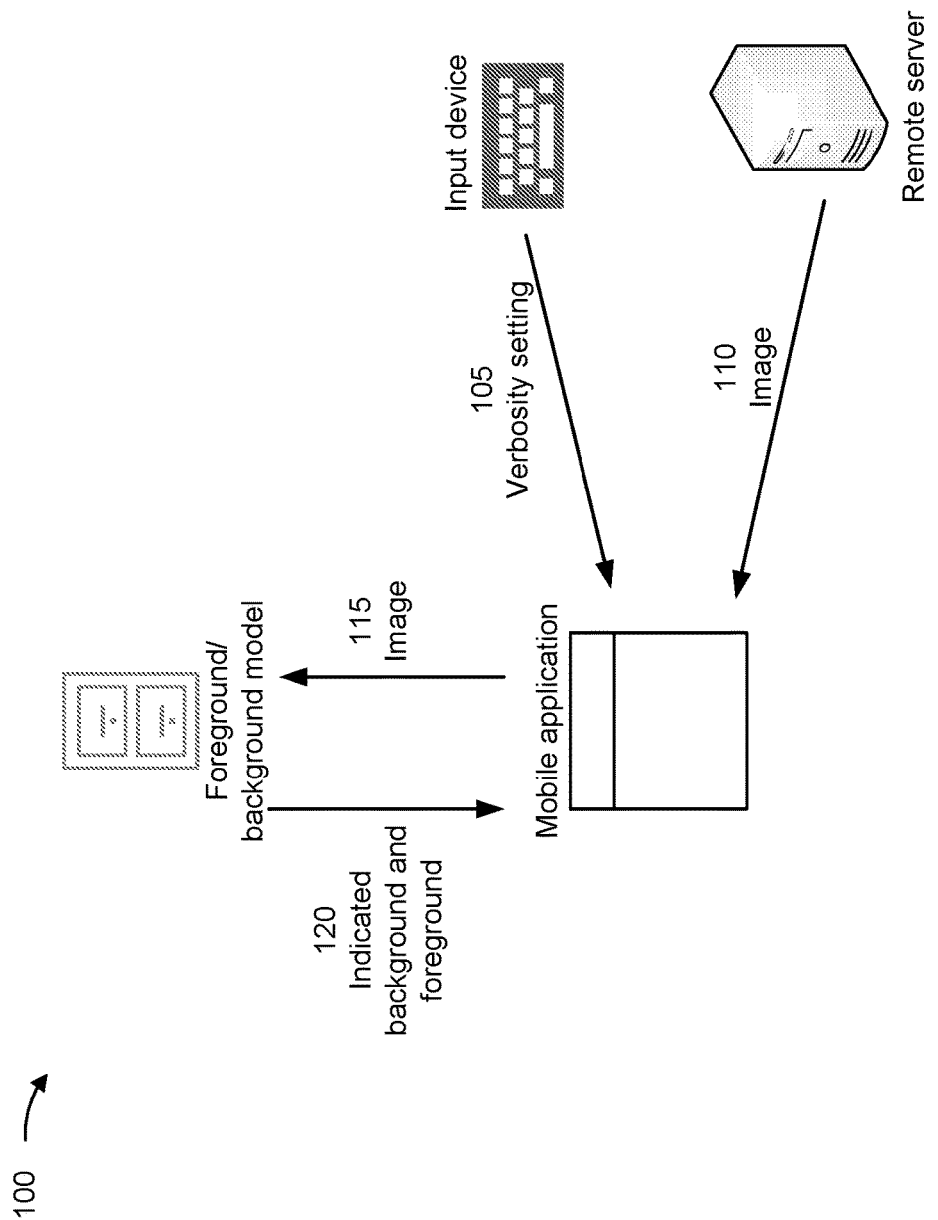
FIGS. 1A-1D are diagrams of an example implementation relating to image description generation for screen readers, in accordance with some embodiments of the present disclosure.

As shown in FIG. 1A and by reference number 105, the mobile application may receive (e.g., from the input device) a setting indicating a level of verbosity. For example, the user may select the level from a plurality of possible levels (e.g., selecting a number from a possible range or selecting a qualitative level like "high" or "low" from a set of possible qualitative levels, among other examples). Accordingly, the setting may include a data structure (e.g., an integer, a class object, and/or another type of data structure) indicating the level of verbosity.

In some implementations, the mobile application may receive the setting via a visual component (e.g., checkboxes, radio buttons, and/or another type of visual component). Alternatively, the mobile application may receive the setting via a voice command.

As shown by reference number 110, the mobile application may receive an image for conversion to speech. For example, the mobile application may transmit, and the remote server may receive, a request for content. Accordingly, the mobile application receives the image in response to the request. In some implementations, the mobile application may receive (e.g., from the input device) an indication of a webpage (e.g., an Internet protocol (IP) address, a uniform resource locator (URL), and/or another type of indication), such that the request is for content indexed to the webpage. For example, the request may include a hypertext transfer protocol (HTTP) request, a file transfer protocol (FTP) request, and/or another type of request for content. Additionally, the remote server may be associated with the webpage. For example, the mobile application may use a domain name service (DNS) and/or another third party to identify the remote server based on the indication of the webpage.

As shown by reference number 115, the mobile application may apply a foreground model to the image to identify a foreground of the image and a background of the image. In some implementations, the foreground model may use gradients, color patterns, and/or similar properties, associated with the image, to identify a portion of the image (e.g., one or more portions of the image) as foreground and a portion of the image (e.g., one or more portions of the image) as background. In another example, the foreground model may use a background mixture model to distinguish background pixels from foreground pixels based on a corresponding mixture of Gaussian functions representing each pixel. Accordingly, the foreground may be identified within a data structure (e.g., an array and/or another type of data structure) storing coordinates of pixels in the image classified as foreground. Similarly, the background may be identified within a data structure (e.g., an array and/or another type of data structure) storing coordinates of pixels in the image classified as background, or the background may be defaulted to remaining pixels not classified as foreground. Alternatively, the foreground may be identified within a data structure (e.g., a class object and/or another type of data structure) storing coordinates of a bounding box (e.g., one or more bounding boxes) enclosing pixels classified as foreground. Similarly, the background may be identified within a data structure (e.g., a class object and/or another type of data structure) storing coordinates of a bounding box (e.g., one or more bounding boxes) enclosing pixels classified as background, or the background may be defaulted to remaining pixels not classified as foreground. Although described with the background including remaining pixels not classified as foreground, other implementations may instead default the foreground as including remaining pixels not classified as background.

Accordingly, as shown by reference number 120, the mobile application may receive, as output from the foreground model, indications of the foreground and the background. For example, the indications may include data structures as described in connection with reference number 115. Additionally, or alternatively, the foreground model may output two image files (or other similar data structures), where a first image file includes the foreground, and the second image file includes the background.

Figure 1B:
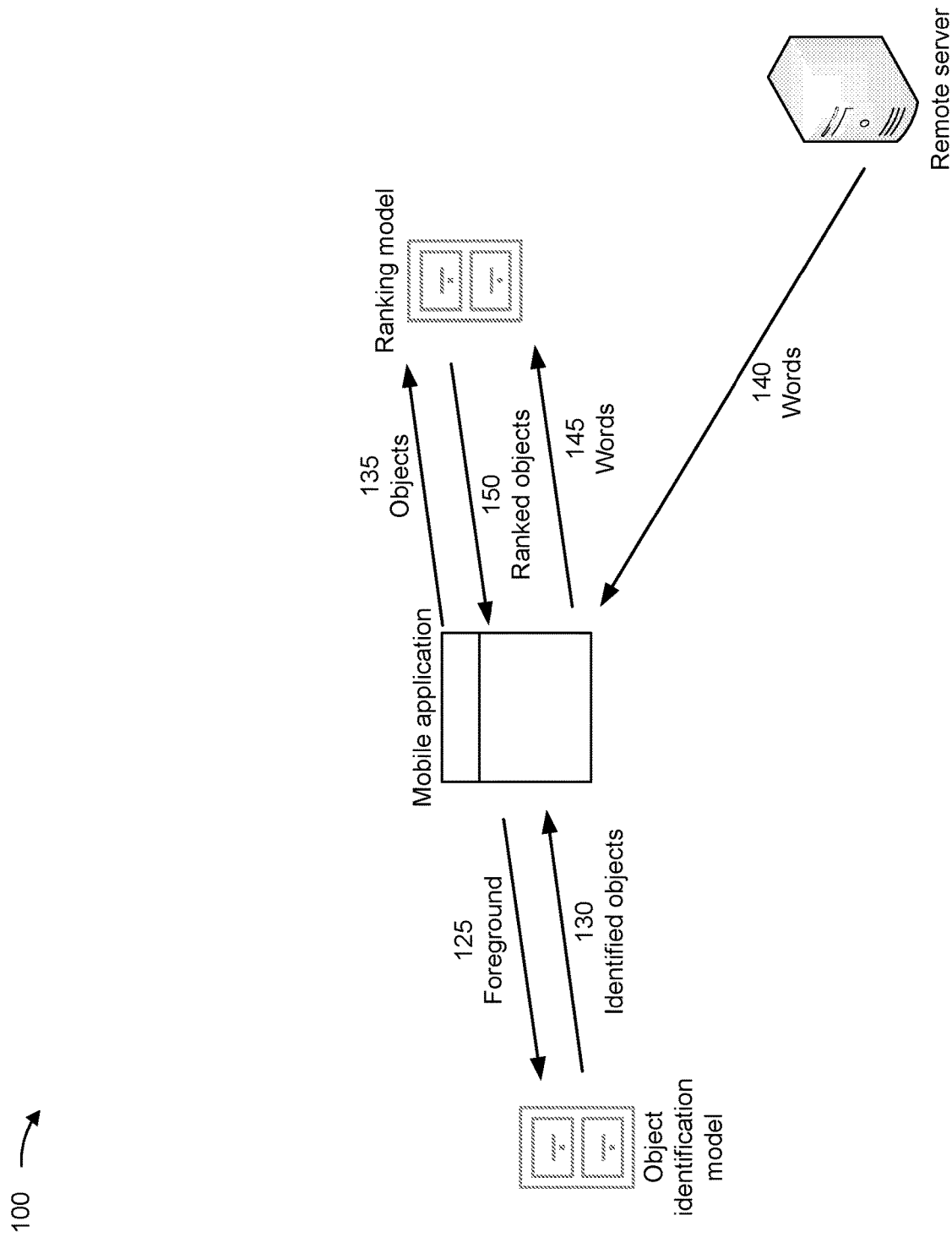

As shown in FIG. 1B and by reference number 125, the mobile application may apply an object detection model to identify, within the foreground of the image, a set of objects. In some implementations, the object detection model may be a computer vision model. For example, the object detection model may include a support vector machine to identify the set of objects. For example, the object detection model may include a Viola-Jones object detection framework (e.g., based on Haar features), a scale-invariant feature transform (SIFT) model, or a histogram of oriented gradients (HOG) model, among other examples. In another example, the object detection model may include a neural network, such as a convolutional neural network (CNN) like a region-based CNN (R-CNN), a single shot multibox detector (SSD), or a "you only look once" (YOLO) model, among other examples. Accordingly, the object detection model may identify the set of objects in the foreground. For example, the mobile application may input a file representing the foreground (e.g., received from the foreground model or generated by the mobile application based on an indication from the foreground model) to the object detection model.

Additionally, in some implementations, the object detection model may determine a set of bounding boxes corresponding to the set of objects. For example, each object may be identified within a data structure (e.g., a class object and/or another type of data structure) storing coordinates of a bounding box that encloses pixels classified as part of the object. Additionally, the data structure may include a classification for the object.

Accordingly, as shown by reference number 130, the mobile application may receive, as output from the object detection model, indications of the set of objects. For example, the indications may include data structures as described in connection with reference number 125. Additionally, or alternatively, the object detection model may output image files (or other similar data structures), where each image file includes pixels classified as part of the corresponding object for the image file.

As shown by reference number 135, the mobile application may apply a ranking model to the set of objects (e.g., to determine relevance). In some implementations, the model may rank the set of objects based on sizes and locations of the corresponding set of bounding boxes. For example, the model may rank objects higher that have larger bounding boxes and/or bounding boxes closer to a center point of the image (or a center point of the foreground). The model may perform an initial ranking based on bounding box sizes and break ties using distances of the bounding boxes (e.g., centers of the bounding boxes) to the center point of the image, or may perform an initial ranking based on distances of the bounding boxes to the center point of the image and break ties using bounding box sizes. Alternatively, the model may score each object using a weighted combination of bounding box size and distance to the center point of the image and rank the objects using the scores.

In some implementations, and as shown by reference number 140, the mobile application may receive a set of words associated with the image. For example, the mobile application may transmit, and the remote server may receive, a request for content. Accordingly, the mobile application receives the set of words in response to the request. In some implementations, the mobile application may receive (e.g., from the input device) an indication of a webpage (e.g., an IP address, a URL, and/or another type of indication), such that the request is for content indexed to the webpage. For example, the request may include an HTTP request, an FTP request, and/or another type of request for content. Additionally, the remote server may be associated with the webpage. For example, the mobile application may use a DNS and/or another third party to identify the remote server based on the indication of the webpage. In some implementations, the request for the set of words may be separate from the request for the image, as shown in FIGS. 1A-1B. Alternatively, the request for the set of words may be the same as the request for the image (e.g., such that the set of words are received with the image).

The ranking model may combine the factors described above with the set of words to rank the objects, as shown by reference number 145. For example, a machine learning model as described in connection with FIGS. 2A-2B may combine bounding box sizes, distances to the center point, and whether names of the objects are included in the set of words to rank the objects. For example, a database may store a plurality of words or phrases for each object classification from the object detection model; accordingly, the ranking model may search for the plurality of words or phrases, associated with each object, in the set of words in order to rank the object. In some implementations, the ranking model may additionally or alternatively use a quantity of instances in the set of words that mention the object and/or a distance (e.g., in pixels or in characters within a source code) between the image and a first instance in the set of words that mentions the object when ranking the object.

As shown by reference number 150, the mobile application may receive, as output from the ranking model, an indication of a ranking for the set of objects. For example, the indication may include integers and/or other similar data structures that indicate an order for the set of objects according to the ranking.

Figure 1C:
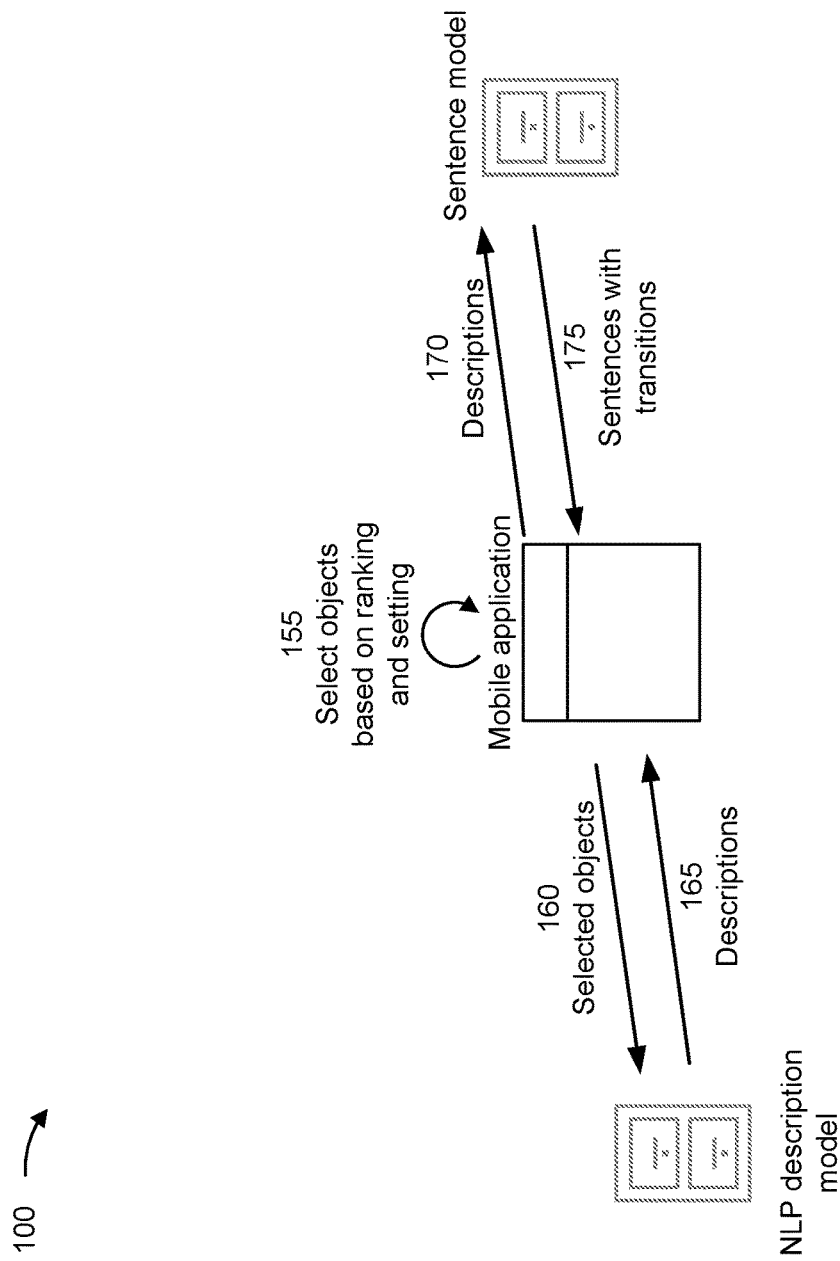

As shown in FIG. 1C and by reference number 155, the mobile application may select a subset of objects, from the set of objects, based on the level of verbosity (e.g., indicated in the setting, as described in connection with reference number 105) and the ranking for the set of objects. For example, each possible level of verbosity may be associated with a quantity of objects, such that the subset of objects includes the quantity of objects, associated with the level of verbosity, according to the ranking and excludes remaining objects from the set of objects.

Accordingly, as shown by reference number 160, the mobile application may apply a description model to the subset of objects to generate descriptions of the subset of objects. For example, the description model may accept, as input, portions of the images classified as included in the objects along with classifications of the objects output by the object detection model. Accordingly, the description model may generate a description for each object in the subset (e.g., by selecting from a database of descriptions). The description model may thus include, at least in part, a natural language processing (NLP) model.

As shown by reference number 165, the mobile application may receive, as output from the description model, the generated descriptions. In some implementations, a length of each description may be based, at least in part, on the level of verbosity (e.g., indicated in the setting, as described in connection with reference number 105). For example, the description model may select shorter descriptions from the database when the level of verbosity is set lower and select longer descriptions from the database when the level of verbosity is set higher. The possible levels of verbosity may be associated with length thresholds such that each generated description satisfies the length threshold for the level of verbosity (e.g., based on selection from the database and/or trimming by the description model).

As a result, the mobile application refrains from generating superfluous descriptions of objects (and/or the background) in the image, which conserves power and processing resources. Additionally, the mobile application provides flexibility in a level of verbosity used when describing the image.

Although described with respect to the set of objects identified in the foreground, the mobile application may alternatively select the background. For example, the mobile application may determine that the background is more important than the foreground. For example, the mobile application may determine that the set of objects (e.g., at least one object) included in the foreground are not mentioned in the set of words and/or that the background is mentioned in the set of words. Additionally, or alternatively, the mobile application may determine that the background is mentioned in the set of words at a distance (e.g., in pixels or in characters within a source code) from the image that satisfies a relevance distance threshold and/or that the set of objects (e.g., at least one object) included in the foreground are mentioned in the set of words at a distance from the image that satisfies an irrelevance distance threshold. Accordingly, the background may be fed to the description model in lieu of the subset of objects.

Alternatively, the background may be ranked similarly to the set of objects such that the background is fed to the description model based on the level of verbosity. Accordingly, the background may be fed to the description model in combination with the subset of objects.

As shown by reference number 170, the mobile application may apply a narrative model to combine the generated descriptions, using connecting phrases (e.g., a plurality of connecting phrases), into a narrative. In some implementations, the narrative model may pseudo-randomly select the connecting phrases in order to provide variety to a user. Additionally, or alternatively, the narrative model may have a database of ranked (or otherwise ordered) connecting phrases and select the connecting phrases according to the order (e.g., in order to mimic natural language flow). In a combinatory example, the narrative model may pseudo-randomly select from starting connecting phrases (e.g., a plurality of starting connecting phrases) and then follow an order of additional connecting phrases associated with the selected starting connecting phrase. Accordingly, the narrative model generates the narrative based on the generated descriptions.

Figure 1D:
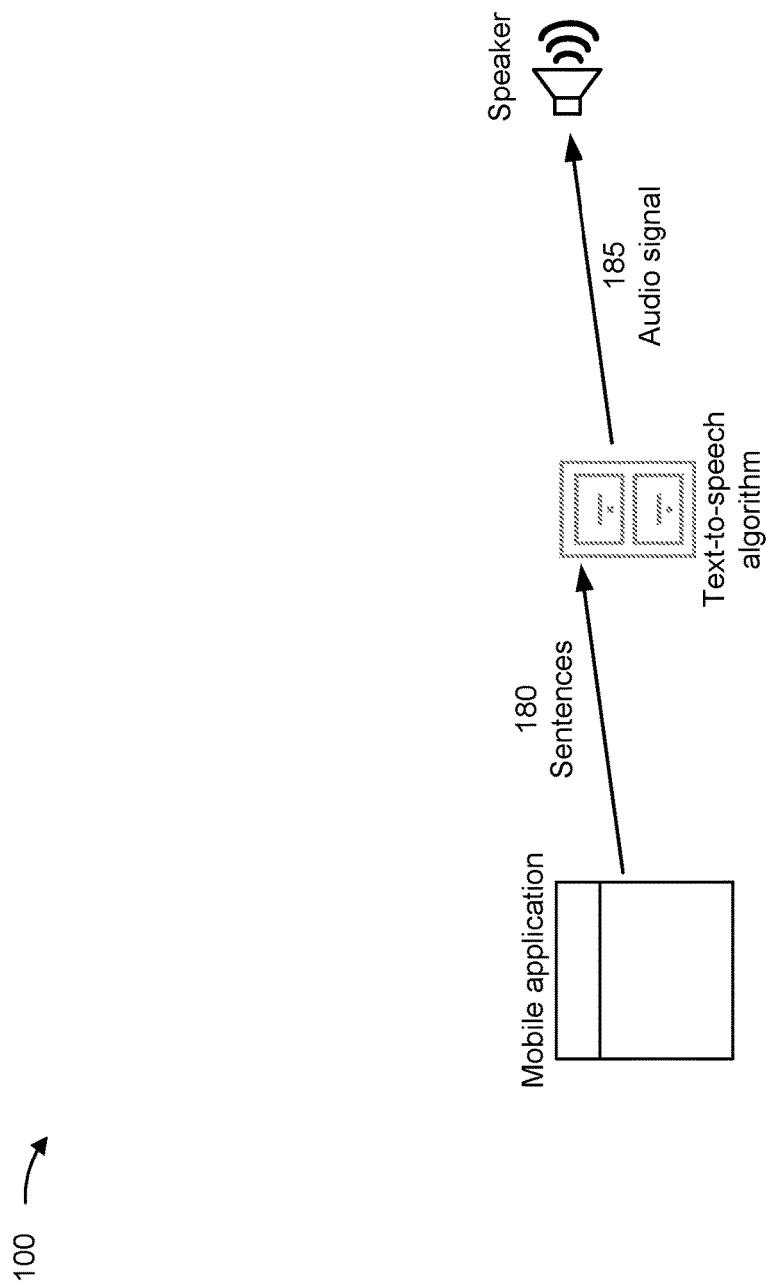

As shown by reference number 175, the mobile application may receive, as output from the narrative model, the narrative. As shown in FIG. 1D and by reference number 180, the mobile application may input the generated descriptions (e.g., as combined in the narrative) to the text-to-speech algorithm. In some implementations, the text-to-speech algorithm is included in the mobile application (e.g., in an executable file, a linked library file, and/or another portion of stored code comprising the mobile application). Alternatively, the text-to-speech algorithm is included in separately stored code such that the mobile application inputs the generated descriptions to an application programming interface (API) associated with the text-to-speech algorithm. For example, the text-to-speech algorithm and the API may be provided by an operating system (e.g., of the user device that is executing the mobile application).

Accordingly, as shown by reference number 185, the text-to-speech algorithm may generate an audio signal (e.g., for output to the speaker) based on the generated descriptions input to the text-to-speech algorithm by the mobile application. For example, the text-to-speech algorithm may use concatenative synthesis, formant synthesis, and/or another technique to generate the audio signal based on the generated descriptions.

By using techniques as described in connection with FIGS. 1A-1D, the mobile application refrains from generating superfluous descriptions, which conserves power and processing resources when the text-to-speech algorithm is run. As indicated above, FIGS. 1A-1D are provided as an example. Other examples may differ from what is described with regard to FIGS. 1A-1D.

FIG. 2 is a diagram illustrating an example 200 of training a machine learning model in connection with image description generation for screen readers. The machine learning model training described herein may be performed using a machine learning system. The machine learning system may include or may be included in a computing device, a server, a cloud computing environment, or the like, such as the user device described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from a remote server, as described elsewhere herein. In some implementations, the machine learning system may receive the set of observations (e.g., as input) from the user device.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the user device. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a bounding box size, a second feature of a distance to a center point, a third feature of whether the observation is mentioned in a set of words, and so on. As shown, for a first observation, the first feature may have a value of 100×50 pixels, the second feature may have a value of 50 pixels, the third feature may have a value of Yes, and so on. These features and feature values are provided as examples, and may differ in other examples. For example, the feature set may include one or more of the following features: a quantity of colors, presence of specific colors, boundary gradients, distance between the observation and a first instance of the observation being mentioned in the set of words, and/or a quantity of instances of the observation being mentioned in the set of words, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a ranking, which has a value of #1 for the first observation.

The feature set and target variable described above are provided as examples, and other examples may differ from what is described above. For example, the target variable may include a relevance score instead.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

Figure 2A:
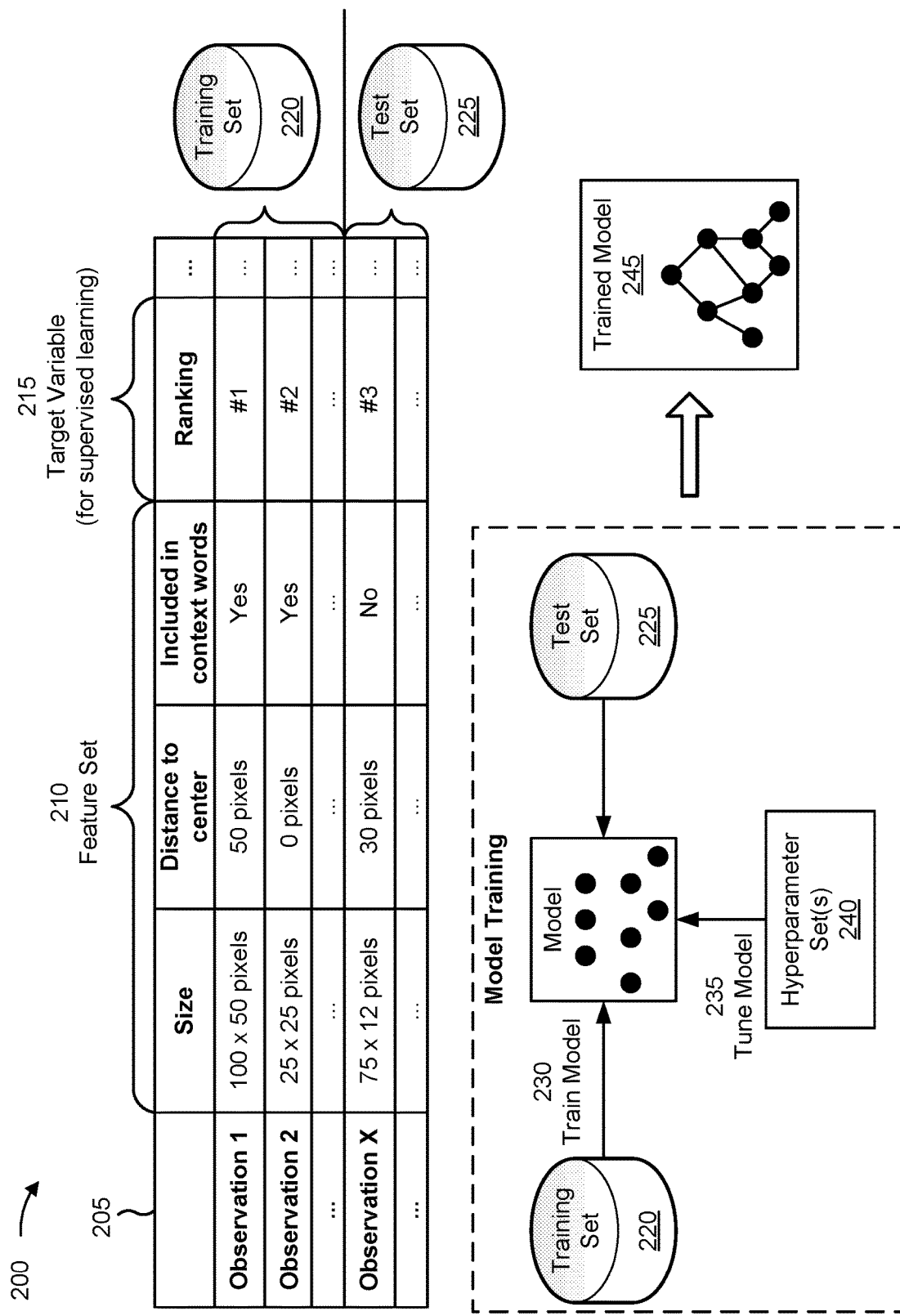
FIGS. 2A-2B are diagrams of an example of training and using a machine learning model, in accordance with some embodiments of the present disclosure.
Figure 2B:
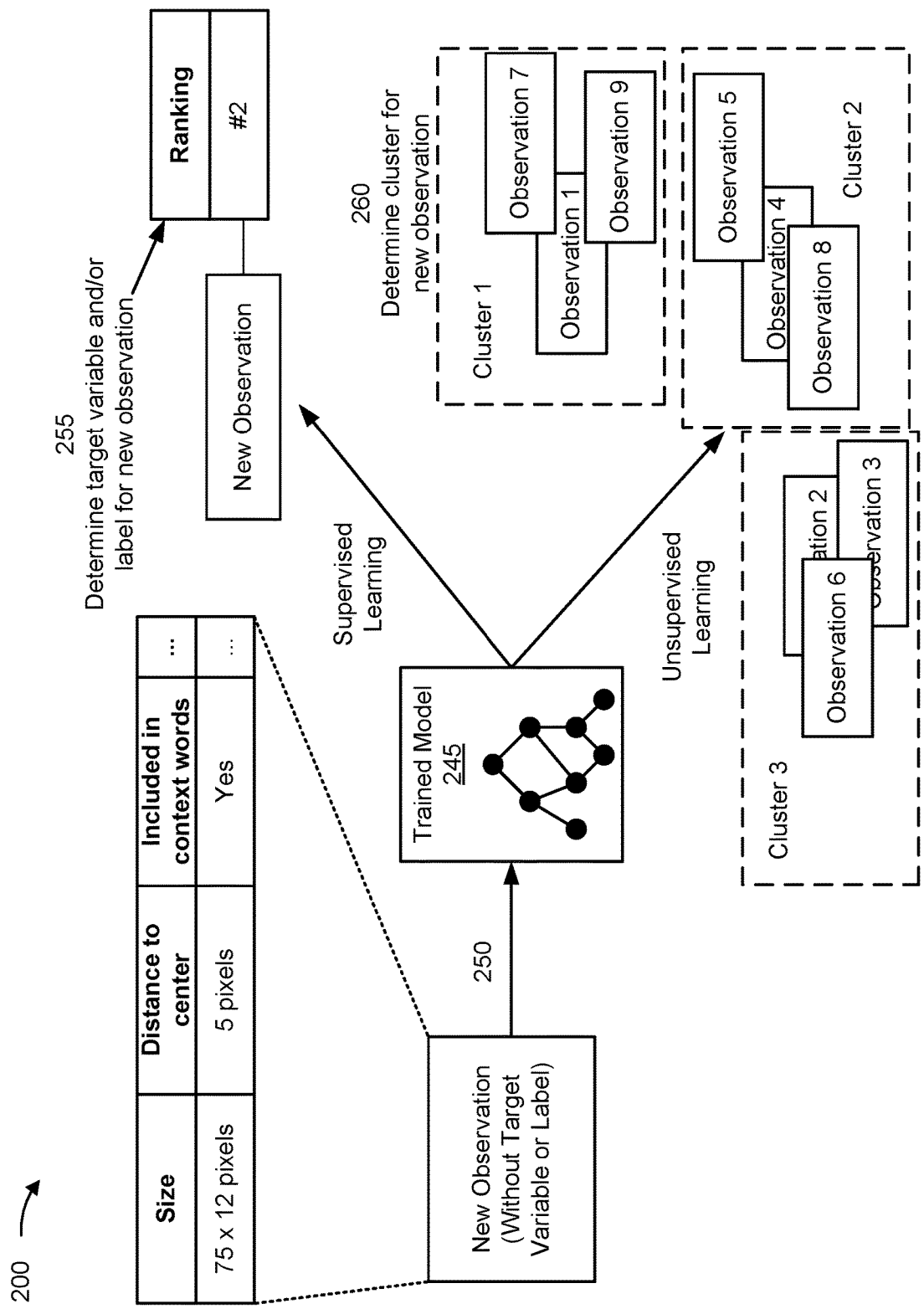

FIG. 2B illustrates applying a trained machine learning model to a new observation. The new observation may be input to the trained machine learning model 245.

As shown by reference number 250, the machine learning system may receive a new observation (or a set of new observations), and may input the new observation to the machine learning model 245. As shown, the new observation may include a first feature of 75×12 pixels, a second feature of 5 pixels, a third feature of Yes, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of #2 for the target variable of ranking for the new observation, as shown by reference number 255 (e.g., such that other observations are moved downward in ranking). Based on this prediction (e.g., based on the value having a particular label or classification or based on the value satisfying or failing to satisfy a threshold), the machine learning system may provide a recommendation and/or output for determination of a recommendation, such as including the new observation in a narrative about an image. Additionally, or alternatively, the machine learning system may perform an automated action and/or may cause an automated action to be performed (e.g., by instructing another device to perform the automated action), such as generating a description for the new observation. As another example, if the machine learning system were to predict a value of #5 for the target variable of ranking, then the machine learning system may provide a different recommendation (e.g., excluding the new observation from the narrative about the image) and/or may perform or cause performance of a different automated action (e.g., refraining from generating a description for the new observation). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., most relevant objects), then the machine learning system may provide a first recommendation, such as including the new observation in a narrative about an image. Additionally, or alternatively, the machine learning system may perform a first automated action and/or may cause a first automated action to be performed (e.g., by instructing another device to perform the automated action) based on classifying the new observation in the first cluster, such as generating a description for the new observation. As another example, if the machine learning system were to classify the new observation in a second cluster (e.g., least relevant objects), then the machine learning system may provide a second (e.g., different) recommendation (e.g., excluding the new observation from the narrative about the image) and/or may perform or cause performance of a second (e.g., different) automated action, such as refraining from generating a description for the new observation.

The recommendations, actions, and clusters described above are provided as examples, and other examples may differ from what is described above. For example, the recommendations associated with a middle relevance cluster may include including the new observation in a narrative about an image when a selected level of verbosity satisfies a verbosity threshold. The actions associated with the middle relevance cluster may include, for example, generating a description for the new observation when the selected level of verbosity satisfies the verbosity threshold.

In this way, the machine learning system may apply a rigorous and automated process to ranking objects for image description generation. The machine learning system enables recognition and/or identification of tens, hundreds, thousands, or millions of features and/or feature values for tens, hundreds, thousands, or millions of observations, thereby increasing accuracy and consistency and reducing delay associated with object ranking relative to requiring computing resources to be allocated for tens, hundreds, or thousands of operators to manually rank objects using the features or feature values. Additionally, the machine learning system conserves power and processing resources by preventing superfluous descriptions from being generated and subsequently fed to a text-to-speech algorithm.

As indicated above, FIGS. 2A and 2B are provided as an example. Other examples may differ from what is described in connection with FIGS. 2A and 2B. For example, the machine learning model may be trained using a different process than what is described in connection with FIG. 2A. Additionally, or alternatively, the machine learning model may employ a different machine learning algorithm than what is described in connection with FIGS. 2A and 2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
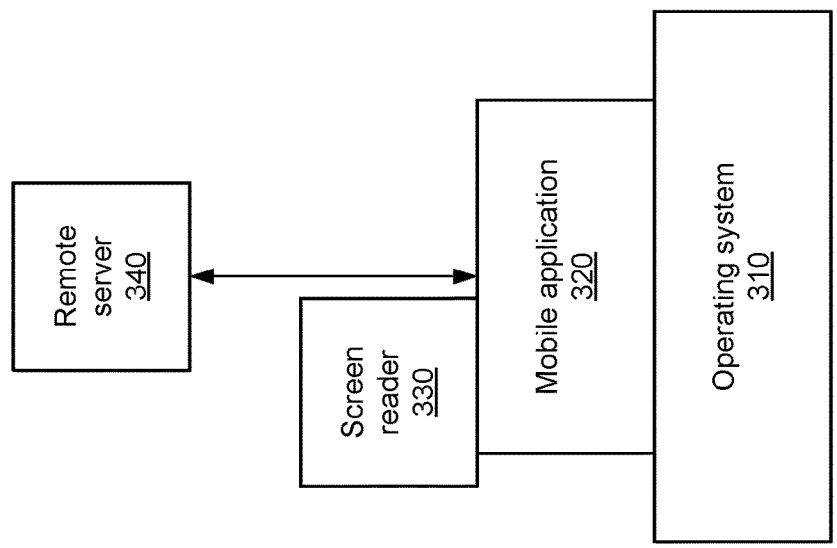
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an operating system 310, a mobile application 320 (e.g., supported by the operating system 310), and a screen reader 330 (e.g., provided the operating system 310 or separately therefrom and used by the mobile application 320), as described in more detail below. The operating system 310, the mobile application 320, and the screen reader 330 may be executed on a user device. The user device may include a communication device. For example, the user device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device may include a speaker to transmit audio to a user. The user device may further include an input device to facilitate interaction with a user. Example input devices include a microphone, a keyboard, a touchscreen, and/or a mouse. Additionally, as further shown in FIG. 3, environment 300 may include a remote server 340. Devices and/or elements of environment 300 may interconnect via wired connections and/or wireless connections.

Figure 4:
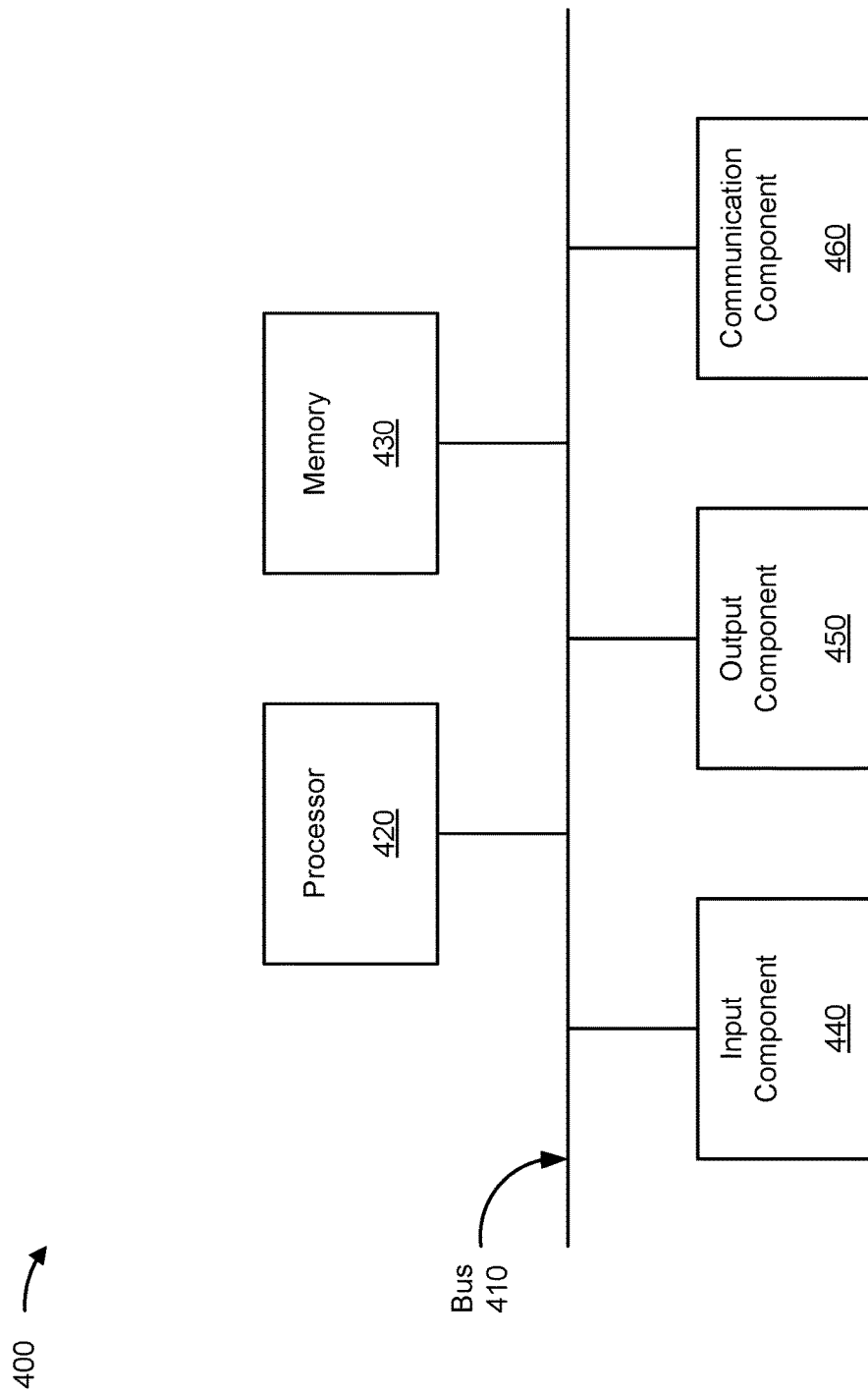
FIG. 4 is a diagram of example components of one or more devices of FIG. 3, in accordance with some embodiments of the present disclosure.

The operating system 310 may include system software capable of managing hardware of the user device (which may include, for example, one or more components of device 400 of FIG. 4) and providing an environment for execution of higher-level software, such as the mobile application 320. For example, the operating system 310 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 310 may additionally provide a graphical user interface (GUI) and process input from a user. In some implementations, the operating system 310 may additionally provide a text-to-speech algorithm and an API for accessing the text-to-speech algorithm.

The mobile application 320 may include an executable capable of running on a user device using the operating system 310. In some implementations, the mobile application 320 may communicate with the remote server 340. For example, the mobile application 320 may use HTTP, FTP, and/or other Internet- or network-based protocols to request information from, transmit information to, and receive information from the remote server 340. Additionally, the mobile application 320 may input an image (optionally with an associated set of words) to the screen reader 330 for conversion to audio, as described elsewhere herein.

The screen reader 330 may include a plug-in or another type of software that executes on top of the mobile application 320. In some implementations, the screen reader 330 may be at least partially integrated into the mobile application 320. Additionally, or alternatively, the screen reader 330 may at least partially operate independently of the mobile application 320. For example, the screen reader 330 may include a standalone text-to-speech algorithm or may be at least partially integrated with the operating system 310.

The remote server 340 may include remote computing devices that provide information to requesting devices over the Internet and/or another network (e.g., a cellular network, a public land mobile network (PLMN), a local area network (LAN), a wide area network (WAN), a private network, the Internet, and/or a combination of these or other types of networks). The remote server 340 may include a standalone server, one or more servers included on a server farm, or one or more servers spread across a plurality of server farms. In some implementations, the remote server 340 may include a cloud computing system. As an alternative, the remote server 340 may include one or more devices, such as device 400 of FIG. 4, that may include a standalone server or another type of computing device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to a user device and/or a remote server. In some implementations, a user device and/or a remote server may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
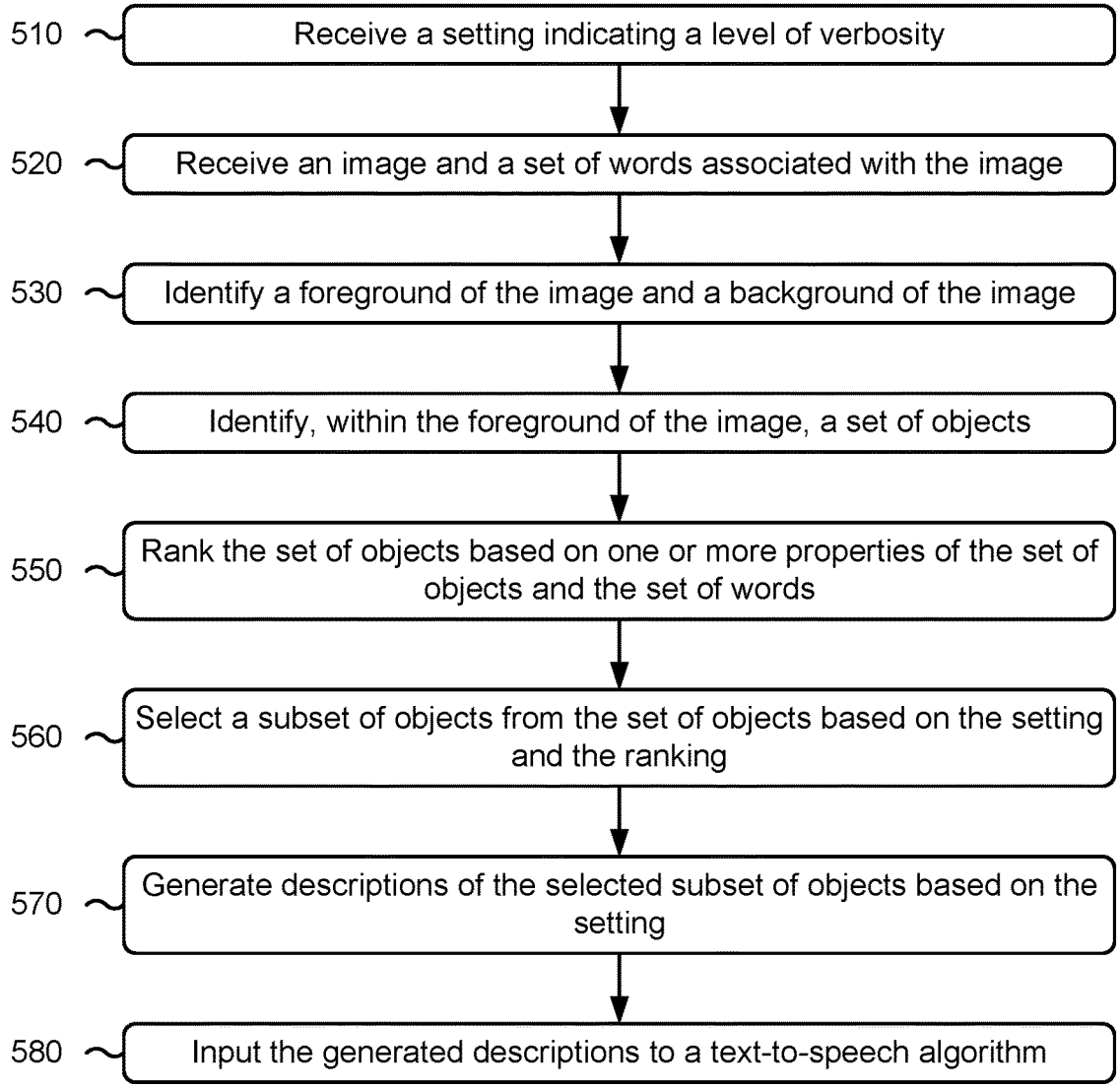
FIG. 5 is a flowchart of an example process relating to image description generation for screen readers, in accordance with some embodiments of the present disclosure.

FIG. 5 is a flowchart of an example process 500 associated with image description generation for screen readers. In some implementations, one or more process blocks of FIG. 5 may be performed by a device (e.g., a user device executing operating system 310 and mobile application 320). In some implementations, one or more process blocks of FIG. 5 may be performed by another device or a group of devices separate from or including the device, such as remote server 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a setting indicating a level of verbosity (block 510). For example, the device (e.g., using processor 420, memory 430, input component 440, and/or communication component 460) may receive a setting indicating a level of verbosity, as described above in connection with reference number 105 of FIG. 1A. As an example, the device may receive the setting via a visual component (e.g., checkboxes, radio buttons, and/or another type of visual component). Alternatively, the device may receive the setting via a voice command.

As further shown in FIG. 5, process 500 may include receiving an image and a set of words associated with the image (block 520). For example, the device (e.g., using processor 420, memory 430, input component 440, and/or communication component 460) may receive an image and a set of words associated with the image, as described above in connection with reference numbers 110 and 140 of FIGS. 1A and 1B, respectively. As an example, the device may transmit, and a remote server may receive, a request for content. Accordingly, the device receives the image and the set of words in response to the request.

As further shown in FIG. 5, process 500 may include identifying a foreground of the image and a background of the image (block 530). For example, the device (e.g., using processor 420 and/or memory 430) may identify a foreground of the image and a background of the image, as described above in connection with reference numbers 115 and 120 of FIG. 1A. As an example, the device may use gradients, color patterns, and/or similar properties, associated with the image, to identify a portion of the image (e.g., one or more portions of the image) as foreground and a portion of the image (e.g., one or more portions of the image) as background. In another example, the device may use a background mixture model to distinguish background pixels from foreground pixels based on a corresponding mixture of Gaussian functions representing each pixel.

As further shown in FIG. 5, process 500 may include identifying, within the foreground of the image, a set of objects (block 540). For example, the device (e.g., using processor 420 and/or memory 430) may identify, within the foreground of the image, a set of objects, as described above in connection with reference numbers 125 and 130 of FIG. 1B. As an example, the object detection model may use a support vector machine to identify the set of objects. In another example, the device may use a neural network to identify the set of objects.

As further shown in FIG. 5, process 500 may include ranking the set of objects based on one or more properties of the set of objects and the set of words (block 550). For example, the device (e.g., using processor 420 and/or memory 430) may rank the set of objects based on one or more properties of the set of objects and the set of words, as described above in connection with reference numbers 135, 145, and 150 of FIG. 1B. As an example, a machine learning model as described in connection with FIGS. 2A-2B may use bounding box sizes, distances to the center point, and whether names of the objects are included in the set of words, among other examples, to rank the set of objects.

As shown in FIG. 5, process 500 may include selecting a subset of objects from the set of objects based on the setting and the ranking (block 560). For example, the device (e.g., using processor 420 and/or memory 430) may select a subset of objects from the set of objects based on the setting and the ranking, as described above in connection with reference number 155 of FIG. 1C. As further shown in FIG. 5, process 500 may include generating descriptions of the selected subset of objects based on the setting (block 570). For example, the device (e.g., using processor 420 and/or memory 430) may generate descriptions of the selected subset of objects based on the setting, as described above in connection with reference numbers 160 and 165 of FIG. 1C. As an example, a length of each description may be based, at least in part, on the level of verbosity (e.g., indicated in the setting). For example, the device may select (e.g., from a database) shorter descriptions when the level of verbosity is set lower and select longer descriptions when the level of verbosity is set higher.

As further shown in FIG. 5, process 500 may include inputting the generated descriptions to a text-to-speech algorithm (block 580). For example, the screen reader 330 (e.g., using processor 420 and/or memory 430) may input the generated descriptions to a text-to-speech algorithm, as described above in connection with reference number 180 of FIG. 1D. As an example, the text-to-speech algorithm may be included in a mobile application (e.g., in an executable file, a linked library file, and/or another portion of stored code comprising the mobile application) performing process 500. Alternatively, the text-to-speech algorithm may be included in separately stored code, like an operating system (e.g., of the device), such that the mobile application inputs the generated descriptions to an API associated with the text-to-speech algorithm.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for image description generation for a screen reader, the system comprising:
   one or more memories; and
   one or more processors, communicatively coupled to the one or more memories, configured to:
   receive, from an input device, a user-selected setting indicating a level of verbosity;
   receive an image and a set of words associated with the image;
   identify a foreground of the image and a background of the image;
   identify, within the foreground of the image, a set of objects;
   rank the set of objects based on one or more properties of the set of objects and the set of words;
   select a subset of objects from the set of objects based on the user-selected setting and the ranking;
   determine that the background is more important than the foreground based on the set of objects not being mentioned in the set of words;

generate a description of the background based on the user-selected setting,
wherein the one or more processors, to generate the description of the background, are configured to select the description, from a database, based on the level of verbosity, wherein the description satisfies a length threshold for the level of verbosity based on selection from the database and trimming by a natural language processing model; and
input the generated description to a text-to-speech algorithm.

2. The system of claim 1, wherein the one or more processors are further configured to:
receive an indication of a webpage; and
transmit, to a remote server associated with the webpage, a request for content indexed to the webpage,
wherein the image and the set of words are received from the remote server in response to the request.

3. The system of claim 1, wherein the one or more processors, to receive the user-selected setting indicating the level of verbosity, are configured to:
receive a voice command indicating the level of verbosity.

4. The system of claim 1, wherein the one or more processors are configured to:
rank the set of objects; and
determine if one or more objects in the set of objects are mentioned in the set of words.

5. The system of claim 1, wherein the one or more processors, to input the generated description to the text-to-speech algorithm, are configured to:
input the generated description to an application programming interface (API) associated with the text-to-speech algorithm and provided by an operating system.

6. The system of claim 1, wherein the one or more processors are further configured to:
use a background mixture model to distinguish background pixels from foreground pixels based on a corresponding mixture of Gaussian functions representing each pixel.

7. The system of claim 1, wherein the one or more processors are configured to:
apply a computer vision model to identify the set of objects and a set of bounding boxes corresponding to the set of objects,
wherein the set of objects are ranked based on the set of bounding boxes.

8. The system of claim 7, wherein the set of objects are ranked further based on sizes and locations of the set of bounding boxes.

9. A method of image description generation for a screen reader, comprising:
receiving, from an input device, a user-selected setting indicating a level of verbosity;
receiving an image and a set of words associated with the image;
identifying a foreground of the image and a background of the image;
identifying, within the foreground of the image, a set of objects;
ranking the set of objects based on one or more properties of the set of objects and the set of words;
selecting a subset of objects from the set of objects based on the user-selected setting and the ranking;
determining that the background is more important than the foreground based on the set of objects not being mentioned in the set of words;
generating a description of the background based on the user-selected setting,
wherein generating the description of the background comprises selecting the description, from a database, based on the level of verbosity, wherein the description satisfies a length threshold for the level of verbosity based on selection from the database and trimming by a natural language processing model; and
inputting the generated description to a text-to-speech algorithm.

10. The method of claim 9, wherein determining that the background is more important than the foreground comprises:
determining at least one object included in the foreground is mentioned in the set of words at a distance from the image that satisfies a distance threshold, wherein the distance is a distance in characters within a source code.

11. The method of claim 9, wherein a length of the description of the background is based on the user-selected setting.

12. The method of claim 9, further comprising:
transmitting, to a remote server, a request for content,
wherein the image and the set of words are received from the remote server in response to the request.

13. The method of claim 9, wherein determining that the background is more important than the foreground comprises:
determining at least one object included in the foreground is mentioned in the set of words at a distance from the image that satisfies a distance threshold, wherein the distance is a distance in pixels.

14. The method of claim 9, wherein determining that the background is more important than the foreground comprises:
determining that the background is mentioned in the set of words.

15. The method of claim 14, wherein the background is mentioned in the set of words at a distance from the image that satisfies a distance threshold.

16. A non-transitory computer-readable medium storing a set of instructions for image description generation for a screen reader, the set of instructions comprising:
one or more instructions that, when executed by one or more processors of a device, cause the device to:
receive, from an input device, a user-selected setting indicating a level of verbosity;
receive an image and a set of words associated with the image;
identify a foreground of the image and a background of the image;
identify, within the foreground of the image, a set of objects;
rank the set of objects based on one or more properties of the set of objects and the set of words;
select a subset of objects from the set of objects based on the user-selected setting and the ranking;
determine that the background is more important than the foreground based on the set of objects not being mentioned in the set of words;
generate a description of the background based on the user-selected setting,
wherein the one or more instructions, to cause the device to generate the description of the background, cause the device to select the description, from a database, based on the level of verbosity, wherein the description satisfies a length threshold for the level of verbosity based on selection from the database and trimming by a natural language processing model; and input the description to a text-to-speech algorithm.

17. The non-transitory computer-readable medium of claim 15, wherein the one or more instructions, when executed by the one or more processors, further cause the device to:

apply a machine learning model to rank the set of objects.

18. The non-transitory computer-readable medium of claim 15, wherein the one or more instructions, when executed by the one or more processors, further cause the device to:

generate a narrative using a narrative model, wherein the narrative includes the description of the background, and wherein a plurality of connecting phrases of the narrative are selected pseudo-randomly.

19. The non-transitory computer-readable medium of claim 16, wherein the one or more instructions, that cause the device to generate the description, cause the device to:

select, using the natural language processing model, a length of the description, based on a voice command indicating the level of verbosity.

20. The non-transitory computer-readable medium of claim 16, wherein the one or more instructions, that cause the device to receive the image and the set of words, cause the device to:

transmit, to a remote server, a request for content, wherein the image and the set of words are received from the remote server in response to the request.

* * * * *